(12) United States Patent
Rezaei et al.

(10) Patent No.: US 10,031,939 B2
(45) Date of Patent: Jul. 24, 2018

(54) AUTOMATED SUPPLEMENTATION OF DATA MODEL

(71) Applicant: Microsoft Technology Licensing, LLC, Redmond, WA (US)

(72) Inventors: Pedram Faghihi Rezaei, Seattle, WA (US); Amir M. Netz, Bellevue, WA (US); Adam D. Wilson, Seattle, WA (US); Christopher A. Hays, Monroe, WA (US); Patrick J. Baumgartner, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 233 days.

(21) Appl. No.: 14/502,687

(22) Filed: Sep. 30, 2014

(65) Prior Publication Data

US 2016/0092603 A1 Mar. 31, 2016

(51) Int. Cl.
*G06F 7/00* (2006.01)
*G06F 17/30* (2006.01)

(52) U.S. Cl.
CPC .... *G06F 17/3043* (2013.01); *G06F 17/30997* (2013.01)

(58) Field of Classification Search
CPC ......... G06F 17/30997; G06F 17/30979; G06F 17/30994; G06F 17/30861; G06F 17/30002
See application file for complete search history.

(56) References Cited

U.S. PATENT DOCUMENTS

| | | | | |
|---|---|---|---|---|
| 5,654,771 A | * | 8/1997 | Tekalp | H04N 19/54 348/699 |
| 5,929,858 A | * | 7/1999 | Shibata | G06F 17/10 345/418 |
| 6,014,138 A | * | 1/2000 | Cain | G06F 8/24 715/744 |

(Continued)

FOREIGN PATENT DOCUMENTS

CN 101706818 A 5/2010

OTHER PUBLICATIONS

Office Action dated Dec. 30, 2016 cited in U.S. Appl. No. 14/242,607.

(Continued)

*Primary Examiner* — Daniel Kuddus
(74) *Attorney, Agent, or Firm* — Workman Nydegger (57) ABSTRACT

Mechanisms to help a computing system respond to a request for information within a data model. After determining that there is insufficient information within the data model to respond to the request, the computing system identifies one or more additional data sources that are external to the data model and that contain information suitable to respond to the request. The computing system then automatically supplements the data model with at least one of such additional data sources. The computing system then responds to the request using the supplemented data model. In some embodiments, the supplementation is performed in advance of the request by analyzing the characteristics of the data model and/or by anticipating possible future requests. Thus, a data model grows automatically in response to particular usage of that data model to satisfy requests.

20 Claims, 5 Drawing Sheets

(56) References Cited

U.S. PATENT DOCUMENTS

| | | | |
|---|---|---|---|
| 6,073,111 A * | 6/2000 | Leymann | G06Q 10/0631 705/301 |
| 7,006,662 B2 | 2/2006 | Alattar et al. | |
| 7,650,196 B2 * | 1/2010 | Gordon | G05B 19/409 700/17 |
| 7,737,979 B2 | 6/2010 | Robertson et al. | |
| 7,827,159 B2 * | 11/2010 | Dettinger | G06F 17/30864 707/694 |
| 7,962,486 B2 | 6/2011 | Adair et al. | |
| 8,103,669 B2 | 1/2012 | Castellani et al. | |
| 8,165,989 B2 * | 4/2012 | Dettinger | G06F 17/30864 707/603 |
| 8,255,376 B2 | 8/2012 | Datta | |
| 8,326,873 B2 * | 12/2012 | Ellis | G06F 17/30424 707/783 |
| 8,392,438 B2 | 3/2013 | Dong et al. | |
| 8,392,441 B1 | 3/2013 | Papachristou et al. | |
| 8,423,567 B1 | 4/2013 | Finneran et al. | |
| 8,493,406 B2 | 7/2013 | Rubin et al. | |
| 8,531,451 B2 | 9/2013 | Mital et al. | |
| 8,576,218 B2 | 11/2013 | Martinez et al. | |
| 8,677,235 B2 | 3/2014 | Chronister et al. | |
| 9,449,329 B2 * | 9/2016 | Ellis | G06F 17/30424 |
| 2005/0060647 A1 | 3/2005 | Doan et al. | |
| 2005/0289123 A1 * | 12/2005 | Dettinger | G06F 17/30864 |
| 2006/0235831 A1 * | 10/2006 | Adinolfi | G06Q 40/00 |
| 2007/0078536 A1 * | 4/2007 | Gordon | G05B 19/409 700/83 |
| 2007/0250517 A1 | 10/2007 | Bestgen et al. | |
| 2008/0036767 A1 | 2/2008 | Janzen | |
| 2008/0065634 A1 | 3/2008 | Krinsky | |
| 2008/0154975 A1 * | 6/2008 | Dettinger | G06F 17/30864 |
| 2008/0195646 A1 * | 8/2008 | Meijer | G06F 17/30929 |
| 2009/0013287 A1 | 1/2009 | Helfman et al. | |
| 2009/0083241 A1 * | 3/2009 | Jones | G06F 17/30899 |
| 2009/0096812 A1 | 4/2009 | Boixel et al. | |
| 2009/0105984 A1 | 4/2009 | Wen et al. | |
| 2009/0253470 A1 | 10/2009 | Xu | |
| 2009/0254557 A1 | 10/2009 | Jordan | |
| 2010/0131546 A1 * | 5/2010 | Mital | G06F 17/30241 707/769 |
| 2011/0041087 A1 | 2/2011 | Leveille et al. | |
| 2011/0271174 A1 | 11/2011 | Kissa et al. | |
| 2011/0314400 A1 | 12/2011 | Mital et al. | |
| 2012/0023101 A1 | 1/2012 | Heimendinger et al. | |
| 2012/0102419 A1 | 4/2012 | Mital et al. | |
| 2012/0215763 A1 * | 8/2012 | Hughes | G06F 17/30566 707/718 |
| 2013/0176315 A1 | 7/2013 | Winkle et al. | |
| 2013/0304759 A1 * | 11/2013 | Jones | G06F 17/30899 707/769 |
| 2013/0311510 A1 * | 11/2013 | Ellis | G06F 17/30424 707/769 |
| 2013/0339363 A1 | 12/2013 | Khosravy et al. | |
| 2014/0033079 A1 | 1/2014 | Sage et al. | |
| 2014/0198105 A1 | 7/2014 | Gibson et al. | |
| 2014/0351261 A1 | 11/2014 | Aswani et al. | |
| 2015/0149466 A1 | 5/2015 | Harten | |
| 2015/0278315 A1 * | 10/2015 | Baumgartner | G06F 17/30554 715/763 |
| 2015/0278371 A1 | 10/2015 | Anushka et al. | |
| 2015/0302051 A1 | 10/2015 | Baumgartner et al. | |
| 2016/0092603 A1 * | 3/2016 | Rezaei | G06F 17/3043 707/736 |
| 2016/0125195 A1 * | 5/2016 | Plumb | G06F 21/6218 726/30 |
| 2016/0188658 A1 | 6/2016 | Thomson et al. | |
| 2016/0205137 A1 | 7/2016 | Babb et al. | |

OTHER PUBLICATIONS

Office Action dated Jan. 21, 2016 cited in U.S. Appl. No. 14/257,633.
Office Action dated Mar. 25, 2016 cited in U.S. Appl. No. 14/242,607.
Office Action dated Jul. 28, 2016 cited in U.S. Appl. No. 14/257,633.
Office Action dated Aug. 31, 2016 cited in U.S. Appl. No. 14/242,607.
Elmqvist et al., "Hierarchical Aggregation for Information Visualization: Overview, Techniques and Design Guidelines", IEEE, Mar. 11, 2010, 16 pages.
Office Action dated Jun. 1, 2017 cited in U.S. Appl. No. 14/242,607.
Office Action dated May 4, 2017 cited in U.S. Appl. No. 14/257,633.
Office Action dated Oct. 18, 2017 cited in U.S. Appl. No. 14/257,633.

* cited by examiner

AUTOMATED SUPPLEMENTATION OF DATA MODEL

BACKGROUND

Computing systems have revolutionized the way people communicate, do business, and play, and has enabled what is now termed the "information age". The Internet may be used to access a wide volume of information, and databases are likewise infused with large quantities of data. In order to permit navigation through such data, data is often represented within a data model, which model describes various data objects within a collection, and includes the properties and relationships of those data objects.

The data model is further capable of receiving queries, interpreting queries, and responding to the queries with selected data identified in the query. There are also conventional tools for augmenting data models by adding one or more data objects to the data model, and describing the properties of those new data objects, and how the additional data object(s) relate to the other data object(s) (existing or new) in the data model.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein provide technology to help a computing system to respond to a request for information contained within a data model. After determining that there is insufficient information within the data model to respond to the request, the computing system identifies one or more additional data sources that are external to the data model and that contain information suitable to respond to the request. The computing system then automatically supplements the data model with at least one of such additional data sources. The computing system then responds to the request using the supplemented data model. In some embodiments, the supplementation may be performed in advance of the request by analyzing the characteristics of the data model and/or by anticipating possible future requests. Thus, a data model may grow automatically in response to particular usage of that data model to satisfy requests.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

At least some embodiments described herein provide technology to help a computing system to respond to a request for information within a data model. After determining that there is insufficient information within the data model to respond to the request, the computing system identifies one or more additional data sources that are external to the data model and that contain information suitable to respond to the request. The computing system then automatically supplements the data model with at least one of such additional data sources. The computing system then responds to the request using the supplemented data model. In some embodiments, the supplementation may be performed in advance of the request by analyzing the characteristics of the data model and/or by anticipating possible future requests. Thus, a data model may grow automatically in response to particular usage of that data model to satisfy requests.

Some introductory discussion of a computing system will be described with respect to FIG. 1. Then, example user interfaces, methods and supporting architectures will be described with respect to subsequent figures.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

Figure 1:
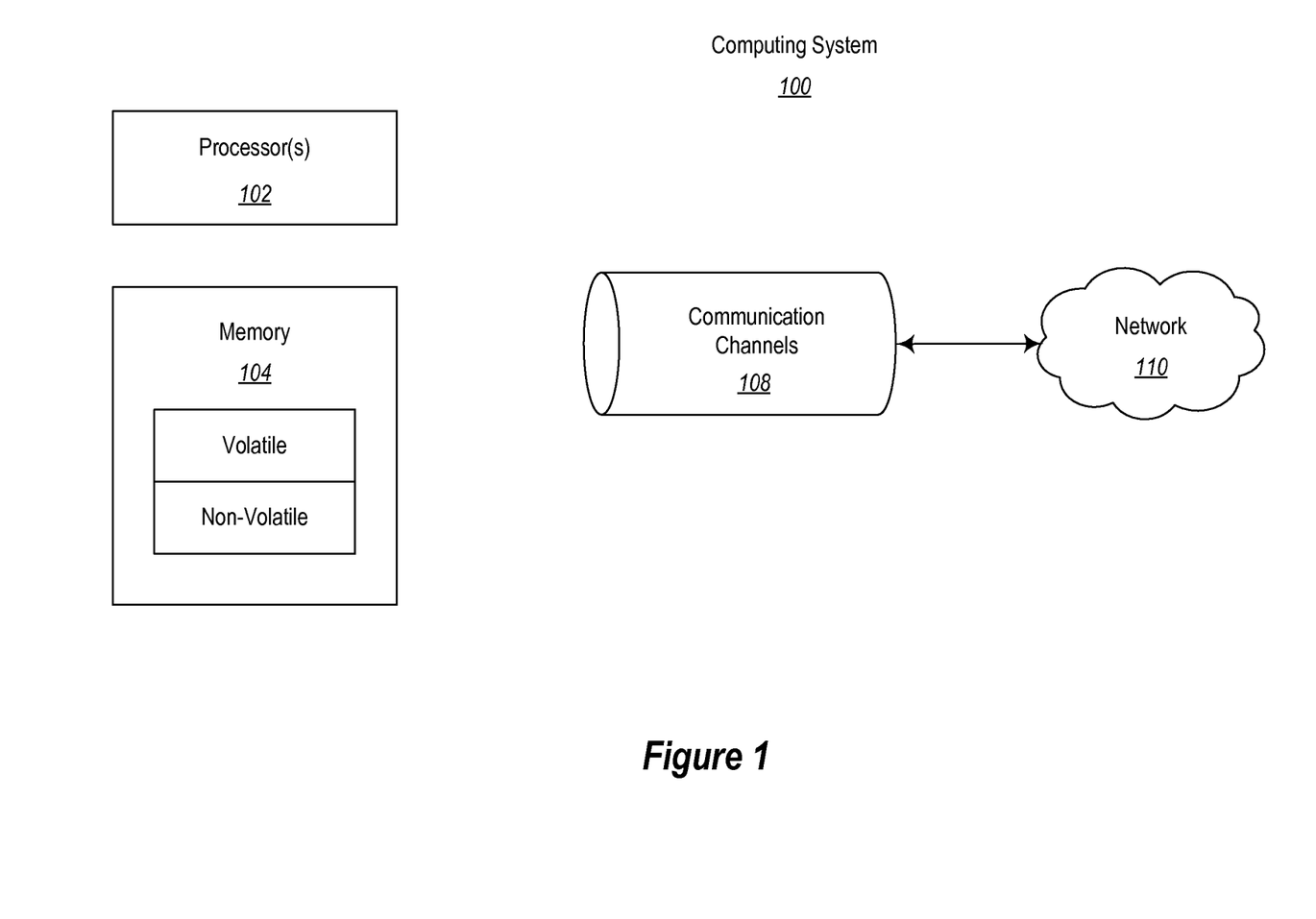
FIG. 1 illustrates an example computing system in which the principles described herein may be employed.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act directs the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other tangible medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
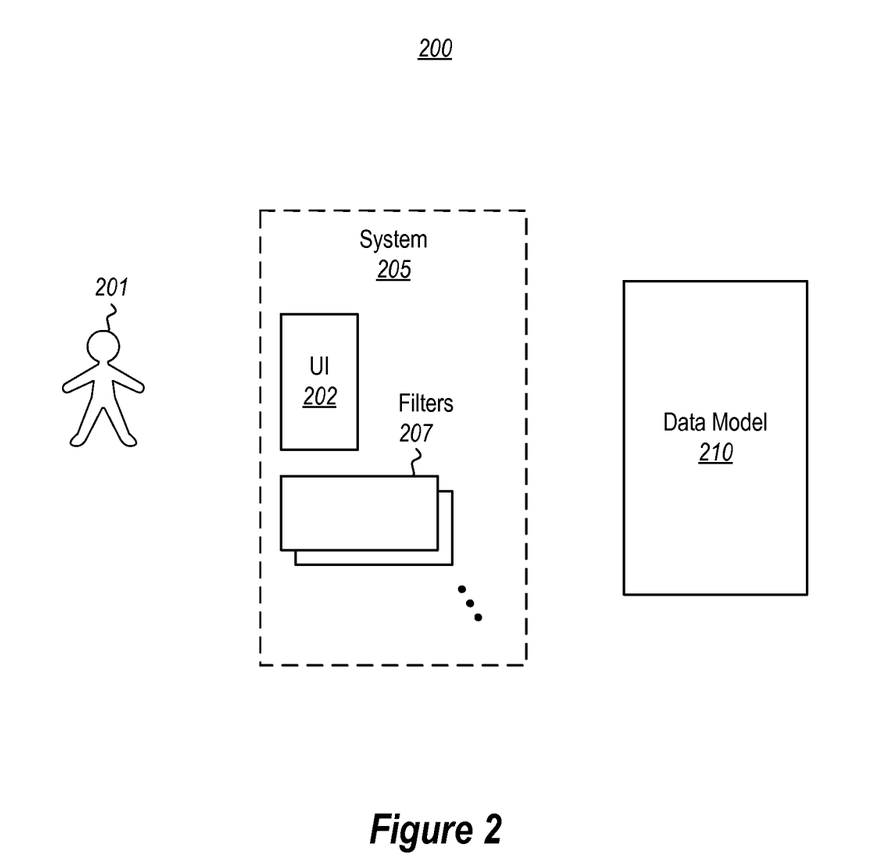
FIG. 2 illustrates a system that may represent an architecture that runs in the context of a computing system such as, for example, the computing system of FIG. 1.

FIG. 2 illustrates a system 200 that may represent an architecture that runs in the context of a computing system such as, for example, the computing system 100 of FIG. 1. The various element illustrated in the system 200 may be software, hardware, firmware, or a combination thereof.

The system 200 includes a data model 210 that provides access to a set of data items that are interrelated and defines the relationships between the set of data items. That data model 210 is further capable of receiving queries, interpreting queries, and responding to the queries with selected data. The information within the data model 210 may include expressed and implicit references to data. The data model 210 may be an authored data model in which case a data model author defines the relationships between the data.

The data model 210 may also be a data model that has been expanded one or more times with various auxiliary information data not originally within the authored data model. Accordingly, the term "data model", as used within this description and in the claims, is to be interpreted broadly. The data model 210 may include voluminous amounts of data. A user 201 may query into the data model 210 by interacting with the data model 210 via a user interface 202 of a system 205 to thereby select a subset of the available data to retrieve. As an example, the system 205 may be the computing system 100 of FIG. 1.

Figure 3:
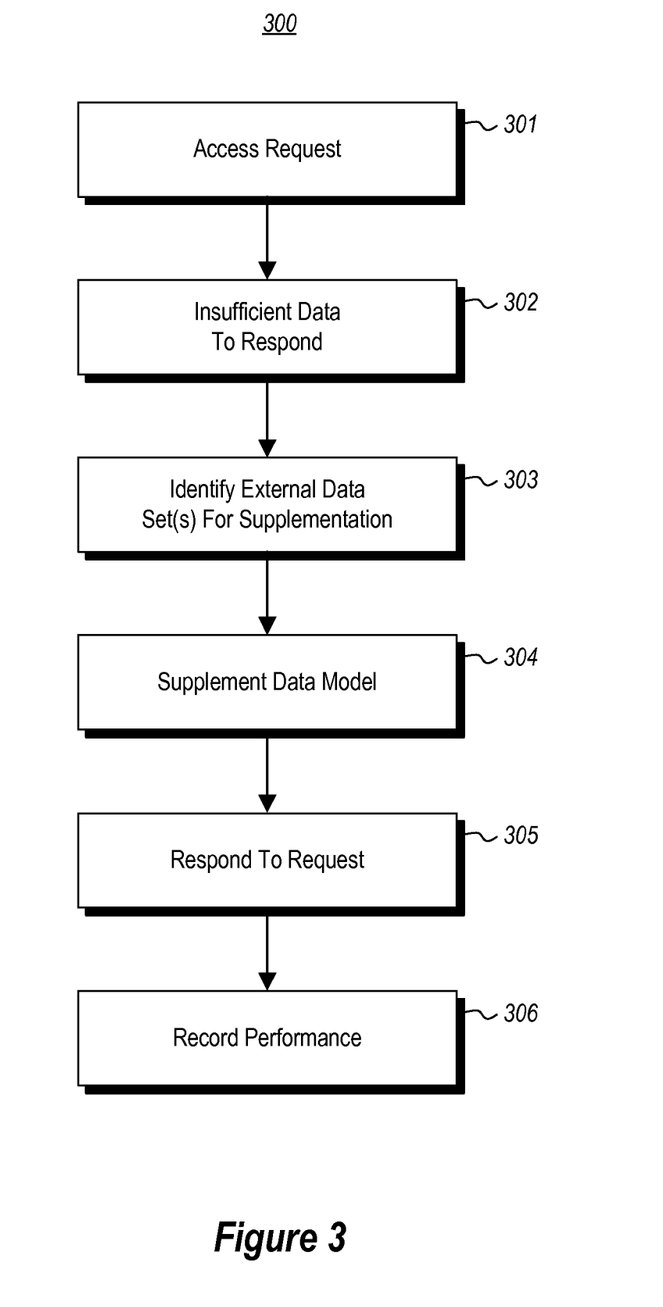
FIG. 3 illustrates a flowchart of a method for a computing system to respond to a request for information from a data model, which method may be performed in the context of FIG. 2.

In accordance with the principles described herein, when there is insufficient information within the data model to respond to a request, the data model may be automatically augmented to include one or more additional data sets. FIG. 3 illustrates a flowchart of a method 300 for a computing system to respond to a request for information from a data model through augmentation of the data model. The method 300 will now be described with reference to the system 200 of FIG. 2, since the method 300 may be performed within the system 200.

In an example that will be described hereinafter as the "athlete example", the data model originally includes a table called "Olympics" with two columns called "Athlete name" and "Country". For instance, the data model 210 might originally just include the table 401 of FIG. 4A. The "AthleteName" column includes the name of all of the athletes in the most recent Winter Olympics, and the "Country" column includes (for each row) the country that the athlete of that row represented. This is just an example and is helpful for its simplicity. The principles described herein may, however, be applied to any data model, regardless of its complexity, subject matter, or architecture.

The method 300 is initiated upon accessing a request (act 301) for information. The request may be, for example, a natural language query, but may be in any form from which desired information may be inferred using an existing data model, and/or by which the system may identify how the existing data model should be augmented to respond with the desired information.

In the context of FIG. 2, the user 201 may generate a request using the user interface 202 that is operated by the system 205. For instance, in the athlete example, suppose that the goal is to get a listing of the names of all European Olympic athletes, without requiring the requestor specify what countries are within Europe. In this case, the user 201 might interact with the user interface 202 to thereby generate the following natural language query: "Return all Olympic athlete names corresponding to Europe". In this phrase, the system 205 determines that two controlling values are "Olympic athlete name" and "Europe."

In accordance with the method 300, the system 205 then determines (act 302) that there is insufficient information within the data model 210 to respond to the request. For instance, the system 205 evaluates the controlling values against the data model. There is indeed an Olympic table 401 (in the example, the only table) in the data model 210 that has a column of "AthleteName", and so the system 205 understands the meaning of "Olympic athlete name". However, the other controlling value is "Europe". This value is not understood in the context of the existing data model 210. Accordingly, the system 205 may determine that the data model, as it exists, cannot satisfy the query.

Once the system 205 determines (act 302) that there is insufficient information within the data model 210 to respond to the request, the system 205 then identifies (act 303) one or more additional data sources that are external to the data model and that contain information suitable to respond to the request. For instance, the request cannot be responded to because the system 205 does not understand the term "Europe". Accordingly, the system 205 begins a search through auxiliary data until a definition of "Europe" is found. For instance, in this search, the system 205 might encounter the table 402 in FIG. 4A to find that the value "Europe" can be found in column "continent". Accordingly, the system 205 learns that Europe is a continent, or in other words, the value "Europe" is of a "continent" data type.

Figure 4A:
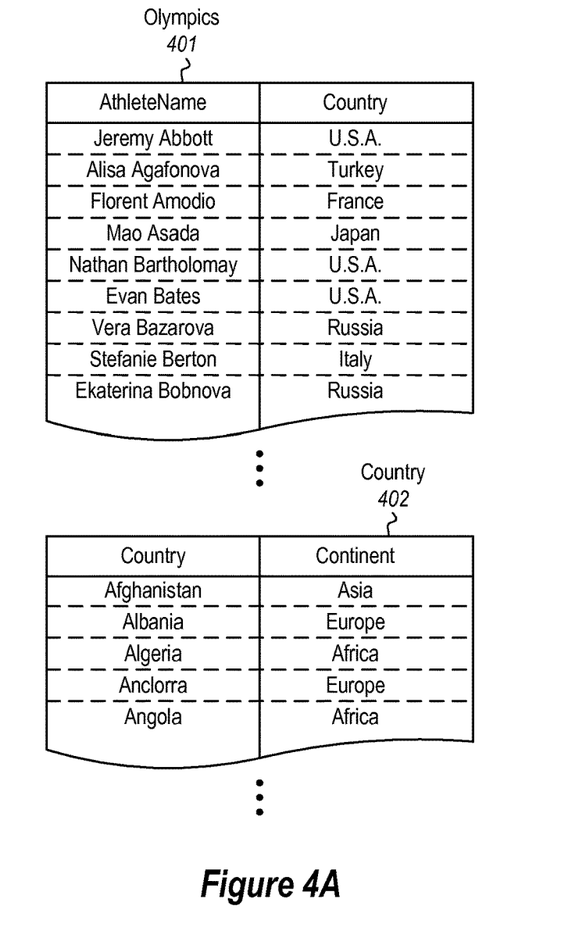
FIG. 4A illustrates several tables that may exist within the supplemented data model in the athlete example, with the first (upper) table being the original table in the data model, and the second (lower) table being the table that supplements the data model.

The system 205 then attempts to find a relationship data describing a relationship between the discovered data type "continent" and any of the data types in the original data model (e.g., originally just table 401). Here, the task is somewhat simplified as table 402 has a "continents" column also a "country" column. Accordingly, table 402 also identifies the relationship between the continent data type and the country data type. In some embodiments, the system 205 may have metadata associated with a number of available data sets, the metadata describing related data types. The system 205 may look to such metadata in the existing data model to identify possible data types that are related in particular ways to known data sets (e.g., that might be used to identify that a continent is a collection of one or more countries).

Figure 4B:
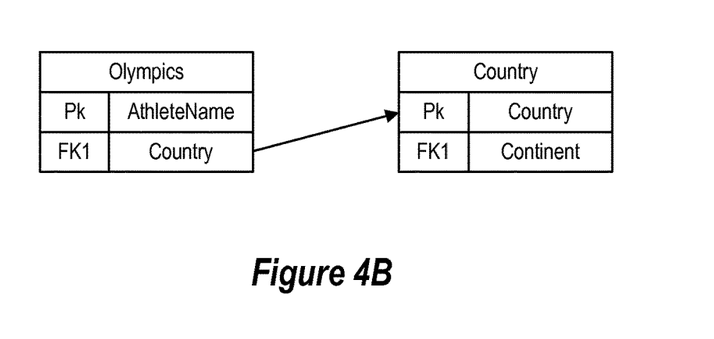
FIG. 4B illustrates the mapping between the two tables of FIG. 4A, which mapping is formed upon supplementation of the original data model with the supplemental table.

As part of this identification of additional data sets, optionally the system 205 supplements (act 304) the data model with at least one of the one or more additional data sources. For instance, in the athlete example, the data model would be supplemented with table 402, which correlates the continent data type and country data type. The relationship data might also be incorporated into the data model. For instance, FIG. 4B illustrates how this mapping may look in the data model after the data model has been supplemented with the supplementary table 402. Of course, the data sets might identify a lot of additional relationships as well. For instance, there might be a table that operates to list details regarding all countries, including population, what continent the country is in, major regions of the country, climate for each region by time of year, rainfall by region by time of year, and so forth.

At this point, the request may be put into a formal query that will be recognized by the now supplemented data model 210. For instance, the query might take the following form:
    Select Olympics.AthleteName from Olympics join Countries on
       Olympics.AthletesName.Country=Countries.Country
       where Countries.Continent="Europe"

The query might then be submitted to the now supplemented data model 210, which then responds (act 305) with the requested information, which the system 205 may then relay to the user. The system 205 may also record (act 306) the performance of the query response in performing the supplementation of the data model and/or in responding to the request. This recorded performance information may later impact future decisions on whether or supplement the data model with the additional data source(s).

The new data set may be adopted into the data model for any length of time. At one extreme, the external data set(s) may be permanently pulled into the data set. On the other extreme, the external data set(s) may augment the data model only for purposes of responding to the request. However, the principles described herein may operate regardless of how long the external data set(s) are used In a second embodiment, rather than supplement the data model to respond to the query, the system 205 estimates a meaning of "Europe". For instance, suppose that the query originally takes the following form:
select Olympics.AthleteName from Olympics where Olympics.Country="Europe"

In this example, again, the data model 210 in its original form only had one table, an Olympics table 401. Reviewing the query, the controlling value "AthleteName" is understood by the data model 210, but the controlling value "Europe" is not. However, the system 205 is now aware that there might be some relationship between the value Europe and the country data type based on the expression "Olympics.Country='Europe'" expressed in the query itself. The system 205 evaluates the value of "Europe" and determines that this is not an acceptable value for a data type of country. The system 205 might then evaluate certain data types that are related to the country type in specific, perhaps predetermined, ways. As an example, continents, regions, treaties subscribers, political structures, and so forth might be related data types with particular accepted values. In this evaluation, the system 205 might determine that the value "Europe" can be of type continent, and that a continent data type is a collection of country data types.

With these predefined possible relationships to the data type country, the user might have specified alternative values for "country" including perhaps any one of the following:
where Olympics.Country=="Capitalist"
where Olympics.Country=="Communist"
where Olympics.Country=="Sub-sahara"
where Olympics.Country=="NATO"
where Olympics.Country=="South-East Asia"
where Olympics.Country=="Patent Cooperation Treaty"
where Olympics.Country=="United Nations"
where Olympics.Country=="Southern Hemisphere"
where Olympics.Country=="Eastern Hemisphere"

Likewise, the user might insert characteristics of the country based on any of a wide variety of relationships such as geographic area, gross domestic product, population, average temperature, and so forth. With these predefined possible relationships to the data type country, the user might have specified alternative values for "Olympics.Country" including perhaps any one of the following:
where Olympics.Country=="High GDP"
where Olympics.Country=="Rapidly Increasing GDP"
where Olympics.Country=="Top 5 in Size"
where Olympics.Country==Low Average Temperature"

In one embodiment, there are numerous and even perhaps countless numbers of external data sets available. Such data sets might actually be any available data set, regardless of where located. For instance, there might be millions of available external data sets available throughout the globe for general public consumption.

In one embodiment, the identification of the external data sets to supplement the data model with may be performed at query time. Furthermore, the supplementation might occur by actually modifying the query. For instance, in the athlete example, by using the external data set mapping countries in Europe to Europe, the query may be modified such that modified request is interpreted to cause the supplementing of the data model to occur.

For instance, in the athlete example, recall that the original request took the following form:
select Olympics.AthleteName from Olympics where Olympics.Country="Europe"
The system 205 may modify that query to be as follows:
select Olympics.AthleteName from Olympics
where
Olympics.Country=="Netherlands" or
Olympics.Country=="Belgium" or
Olympics.Country=="Greece" or
Olympics.Country=="Spain" or
Olympics.Country=="Germany" or
Olympics.Country=="United Kingdom" or
Olympics.Country=="France" or
Olympics.Country=="Italy" or
Olympics.Country=="Sweden" or
Olympics.Country=="Russia"
[and so forth for the remaining European countries]
The system 205 then submits this query.

In some embodiments, the supplementation of the data model occurs when interpreting the query. In that embodiment, in the athlete example, the query would be submitted in the following form:
select Olympics.AthleteName from Olympics where Olympics.Country="Europe"
In this embodiment, the query interpretation interprets the simple query in a manner that it becomes represented in memory the same as it would for the longer query that lists the European countries expressly.

Referring back to FIG. 2, when identifying the external data set(s) to supplement the data model with, the system 205 may apply filters 207 to determine whether the one or more additional data sources satisfy one or more criteria. For instance, the criteria may be security criteria, region-specific criteria, performance criteria, and so forth.

In the case of security criteria, the data set(s) might be verified to be compatible with security protocols, encryption protocols, or the like. Perhaps the data set(s) are verified for sensitivity of data, or to verify that the data set(s) cannot be changed.

In the case of region-specific criteria, the filter might apply political filters. For instance, whether a particular town is in one country or another might be a highly controversial topic. In addition, even the very existence of numerous countries throughout the world is a controversial issue. Accordingly, a data set may not be compatible with the sensibilities of a region where the request comes from, or the user than made the request.

In the case of a performance filter, the system 205 might use the performance information acquired in the act 306 of FIG. 3. Those data set(s) that do not do well in satisfying the customer (or some other performance criteria) might be disfavored. For instance, perhaps a table takes a long time to supplement into the data model, or may perhaps result in a lot of extra time processing request. In that case, that poor performance may be considered when evaluating alternative tables that may be loaded into the data model to satisfy similar requests.

In some embodiments, the system 205 might identify more than one group of data set(s) that might be used to bridge the semantic gap between the query parameters and the data model. For instance, in the athlete example, there may be a number of ways to bridge the gap between continents and countries. For instance, there might indeed be a table that includes both country and continent columns. In fact there might be several available tables that have both of such columns. The system 205 might use the filters to select which alternative to select in bridging the gap.

The system 205 might even identify multiple tables that together bridge the gap. For instance, there might be one table the correlates countries to set of geographical coordinates, and another table that correlates continents to geographical coordinates. The two tables together might be used to correlate European countries to the continent of Europe. However, the processing required to perform this correlation based on such tables might be high, especially compared to a table that has both the country and continent columns. However, if there is some other reason not to use that table, then it might be worth going through the extra processing to work with the two tables.

In the example above, the data model was augmented at the time of the query. In alternative embodiments, the data model may be augmented proactively in advance by evaluating the data model and/or anticipated future requests.

Figure 5:
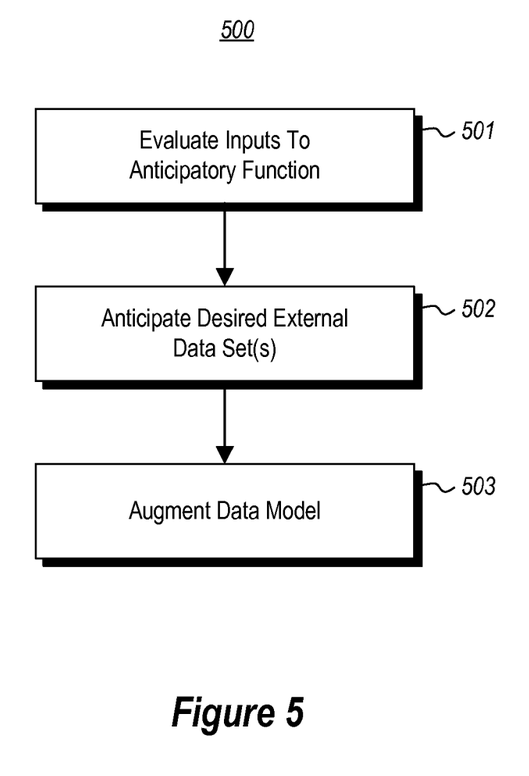
FIG. 5 illustrates a flowchart of a method for supplementing a data model in anticipation of future requests to the data model.

FIG. 5 illustrates a flowchart of a method 500 for supplementing a data model in advance. The system first performance an evaluation (act 501) of the inputs to the anticipatory function. Such evaluation might include, for instance, evaluating the data model itself or anticipating possible future requests. The possible future requests might be made based on previous requests from a particular user or group of users. The data model would then be evaluated to determine how that data model might handle those requests, and how the data model would need to be augmented in response to those future requests. Based on the evaluation (act 501), the system 205 anticipates (act 502) one or more external data sets that may need to be referenced in response to future requests. The system 205 may then augment (act 503) the data model with those one or more data sets.

For instance, if there is a large percentage of future requests that need the data model to be extended with a particular table, that particular table might be appended to the data model without waiting for any future requests. If behavior of the user or group of user changes, then this might result in additional data sets being used to augment the data model. As an example, as the Olympics approach, there may be more keen interest in sports associated with the Olympics. The system may anticipate queries regarding these sports and their athletes by augmenting the data model at least temporarily with Olympic sport related data.

By anticipating augmentation needs of a data model, the processing associated with augmenting with the additional data sets may be performed in advance. Accordingly, when a query does arrive in which that additional data set is used to formulate the response, the response may be formulated faster, thereby reducing latency.

Thus, the principles described herein provide a flexible mechanism for augmenting a data set, whether anticipatorily augmenting the data set in anticipation of possible requests, or whether in response to concurrent queries. From the user perspective, it is as though the data model is aware of whatever the user asks for, even though the data model might not have been originally prepared with sufficient data to respond to the request.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, implemented at a computing system that includes one or more hardware processors, for responding to a request for information associated with a data model that includes a plurality of data objects that are each associated with one of a plurality of data types, and a plurality of relationship types that define relationships between data types, the method comprising:
   receiving a request for data from the data model that includes a first data object and a second data object;
   in response to receiving the request,
      determining that the first data object corresponds to a first data type; and
      determining that the second data object does not correspond to any data type known by the data model; and
   in response to determining that the second data object does not correspond to any data type known by the data model,
      correlating the second data object to a second data type;
      determining a relationship type between the first data type and the second data type;
      based on the second data type or the determined relationship type, identifying an additional data source that includes data associated with the second data type;
   generating a supplemented data model that comprises the data model and the additional data source;
   determining a supplementation time period comprising a time period during which the additional data source supplements the data model; and
   responding to the request within the supplementation time period using the supplemented data model.

2. The method in accordance with claim 1, the method further comprising determining that a controlling value of the request is not referenced in the data model, wherein determining that the data model does not include the information required to respond to the request is performed in response to determining that the controlling value of the request is not referenced in the data model.

3. The method in accordance with claim 2, wherein identifying one or more additional data sources comprises:
   an act of identifying a data source that defines a data type of the controlling value that is not referenced in the data model.

4. The method in accordance with claim 3, wherein supplementing the data model comprises:
   augmenting the data model with the identified data source.

5. The method in accordance with claim 4, wherein supplementing the data model further comprises:
   finding relationship data between the data type of the controlling value and the data model; and
   incorporating the relationship data into the data model.

6. The method in accordance with claim 1, wherein identifying an additional data source comprises:
   applying at least one filter to determine that the additional data source includes the information.

7. The method in accordance with claim 6, the filter comprising a security filter that applies one or more security criteria.

8. The method in accordance with claim 6, the filter comprising a regional filter that applies one or more region-specific criteria.

9. The method in accordance with claim 6, wherein the filter comprises a performance filter that is based on one or more previous recordings of performance when supplementing the data model with the additional data source.

10. The method in accordance with claim 1, the method further comprising:
   recording a performance in supplementing the data model with the additional data source.

11. The method in accordance with claim 10, the recording of the performance causing a future response to a request for information from the data model to include the supplemented data contained in the additional data source.

12. The method in accordance with claim 1, the information within the supplemented data model including one or more author defined references to data and one or more supplemented references to data not defined by an author.

13. The method in accordance with claim 1, supplementing occurring prior to formulating the request, supplementing the data model comprising:
   modifying the request, such that the modified request is interpreted to cause the supplementing of the data model to occur.

14. The method in accordance with claim 1, wherein the determined supplementation time period comprises either permanently supplementing the data model with the additional data source or supplementing the data model with the additional data source only for purposes of responding to the request.

15. The method in accordance with claim 1, wherein the data model is supplemented with one or more data sources in advance of a request corresponding to the one or more data sources based on an evaluation of potential inputs to one or more functions that are anticipated to be used in the future.

16. A computer program product comprising one or more hardware storage devices having stored thereon computer-executable instructions that are executable by one or more hardware processors of a computing system, to cause the computing system to supplement a data model that includes a plurality of data objects that are each associated with one of a plurality of data types, and a plurality of relationship types that define relationships between data types, the computer-executable instructions including instructions that are executable to cause the computer system to perform at least the following:
 receive a request for data from the data model that includes a first data object and a second data object;
 in response to receiving the request,
  determine that the first data object corresponds to a first data type; and
  determine that the second data object does not correspond to any data type known by the data model; and
 in response to determining that second data object does not correspond to any data type known by the data model,
  correlate the second data object to a second data type;
  determine a relationship type between the first data type and the second data type;
  based on the second data type or the determined relationship type, identify an additional data source that includes data associated with the second data type;
  generate a supplemented data model that comprises the data model and the additional data source;
  determine a supplementation time period comprising a time period during which the additional data source supplements the data model; and
  respond to the request within the supplementation time period using the supplemented data model.

17. The hardware storage device in accordance with claim 16, wherein determining that the data model does not include the information required to respond to the request is performed in response to determining that a meaning of a controlling value of the request is not referenced in the data model, wherein identifying an additional data source comprises identifying a data source that defines a data type of the controlling value that is not referenced in the data model.

18. The computer hardware storage device in accordance with claim 16, wherein generating the supplemented data model further comprises:
 finding relationship data between the data type of the controlling value and the data model; and
 incorporating the relationship data into the data model.

19. The computer hardware storage device in accordance with claim 16, wherein identifying the additional data source comprises applying at least one filter to determine that the additional data source includes the information.

20. A computing system, comprising:
 one or more processors; and
 one or more computer-readable hardware storage devices having stored thereon computer-executable instructions that are executable by the one or more processors to cause the computing system to supplement a data model that includes a plurality of data objects that are each associated with one of a plurality of data types, and a plurality of relationship types that define relationships between data types, the computer-executable instructions including instructions that are executable to cause the computing system to perform at least the following:
receive a request for data from the data model that includes a first data object and a second data object;
in response to receiving the request,
 determining that the first data object corresponds to a first data type; and
 determining that the second data object does not correspond to any data type known by the data model; and
in response to determining that the second data object does not correspond to any data type known by the data model,
 correlating the second data object to a second data type;
 determining a relationship type between the first data type and the second data type;
 based on the second data type or the determined relationship type, identify an additional data source that includes data associated with the second data type;
 generate a supplemented data model that comprises the data model and the additional data source;
 determining a supplementation time period comprising a time period during which the additional data source supplements the data model; and
 respond to the request within the supplementation time period using the supplemented data model.

* * * * *